(12) United States Patent
Leiritz (10) Patent No.: US 8,146,510 B2
(45) Date of Patent: Apr. 3, 2012

(54) WORKPIECE SUPPORT SYSTEM

(76) Inventor: Otto Leiritz, Pappenheim (DE)

( * ) Notice: Subject to any disclaimer, the term of this patent is extended or adjusted under 35 U.S.C. 154(b) by 603 days.

(21) Appl. No.: 12/278,007

(22) PCT Filed: Jan. 18, 2007

(86) PCT No.: PCT/DE2007/000084
§ 371 (c)(1),
(2), (4) Date: Aug. 1, 2008

(87) PCT Pub. No.: WO2007/087779
PCT Pub. Date: Aug. 9, 2007

(65) Prior Publication Data
US 2009/0166942 A1    Jul. 2, 2009

(30) Foreign Application Priority Data
Feb. 1, 2006    (DE) .......................... 10 2006 004 921

(51) Int. Cl.
*B61B 7/00*    (2006.01)
*B65G 15/00*    (2006.01)
(52) U.S. Cl. ................................... 104/172.3; 198/343.1
(58) Field of Classification Search .............. 104/88.01, 104/78, 88.02, 140, 165, 162, 163, 172.3, 104/173.1, 202, 204; 198/339.1, 343.1, 343.2, 198/345.1, 345.2
See application file for complete search history.

(56) References Cited

U.S. PATENT DOCUMENTS
5,549,050 A * 8/1996 Rhodes ....................... 104/172.3
6,123,028 A * 9/2000 Bellezza .................... 104/172.3

FOREIGN PATENT DOCUMENTS
| | | |
|---|---|---|
| CH | 669167 A5 | 2/1989 |
| DE | 1718135 U | 3/1956 |
| DE | 3029620 A | 3/1982 |
| DE | 9421998 U1 | 1/1998 |
| EP | 0734976 A1 | 10/1996 |
| FR | 2645131 A1 | 10/1990 |
| GB | 1175786 A | 12/1969 |

* cited by examiner

*Primary Examiner* — Joe Morano, IV
*Assistant Examiner* — R. J. McCarry, Jr.
(74) *Attorney, Agent, or Firm* — Gudrun E. Huckett

(57) ABSTRACT

A workpiece support system has a driven, circulating traction device, a stationary base frame, and at least one workpiece support that has a load carrier and a traction carriage. The traction carriage has a clamping device with upper and lower clamping elements between which the traction means is arranged and with which the traction carriage is clamped by a clamping action onto the traction device. The traction carriage has a spring element that exerts a spring force on at least one of the upper and lower clamping elements for effecting the clamping action. The workpiece support has an actuating element arranged in a leading area in a travel direction of the workpiece support. The actuating element reduces a camping force of the clamping action when the workpiece support bumps into a leading workpiece support in the travel direction. The traction device is guided about two pulleys.

17 Claims, 13 Drawing Sheets

WORKPIECE SUPPORT SYSTEM

BACKGROUND OF THE INVENTION

The invention concerns a workpiece support system having a driven, circulating traction means; a stationary base frame; and at least one workpiece support that comprises a load carrier and a traction carriage.

Workpiece support systems are used for transporting workpieces to various work stations, for example, in case of a production line. Workpiece support systems are known that in accumulation operation are driven by means of several advancing devices with loosely driven workpiece supports. In this connection, the topside of the workpiece supports can always stay face up. These workpiece supports either move adjacent to one another (the workpiece supports are moved in one plane), above one another (the workpiece supports move in several planes), or in special cases are comprised of a combination system (the workpiece supports move, for example, in one plane and are lifted by a lifting system into further planes). For this purpose, for each plane (exception: gravity roll table) and for each lifting system one drive is required, respectively.

DE 1718135 U discloses a workpiece support system in which the workpiece support is configured as a carriage running on rails and connected to an endless transport belt. Once the carriages arrive at the end of the production line, they are returned to the start of the production line. The return is realized by means of a bridge extending across the length of the production line. The bridge is arranged at a slant from the end of the line to the start of the line and is supported by two stands that are arranged at the end and the start of the line. The stands comprise lifts as a lifting system whose task it is to lift the carriages at the end of the production line to the return bridge and to lower them onto the production line after crossing the bridge. The workpiece supports thus move in different planes so that a lifting system must be used. The lifting systems each require a drive so that this configuration of a workpiece support system is expensive and complex.

A further workpiece support system disclosed in DE 30 29 620 A comprises a machine frame in which an endless, driven traction means, in particular a chain, is guided by means of which the workpiece supports supported thereon are entrained primarily by friction. The chain is deflected by two deflection locations wherein one of the deflection locations is driven.

In workpiece support systems it is generally a problem that accumulation of workpiece supports can occur. In such a situation the workpiece supports should be decoupled from the traction means. DE 94 21 998 U1 discloses a workpiece support system in which the workpiece support can be disengaged from the traction means. For this purpose, stationary holding and release elements are provided by means of which the workpiece supports that are passing by and are moved by friction by means of the traction means are disengaged from the traction means. By means of the holding and release elements the workpiece supports are vertically lifted so that friction between workpiece support and traction means is canceled.

CH 669 167 A5 discloses a workpiece support system operating only in one plane in which a traction means engages by a friction shoe a workpiece support. In order to prevent that the entire weight of the workpiece and the workpiece support will load the traction means, it is provided that an adjustable load portion is transmitted via wheels onto a support path. The chain as a traction means is moving in a U-shaped guide. The friction shoe of the workpiece support is pressed by a spring load of a predetermined force against the traction means while the residual load is transmitted by the wheels of the workpiece support onto the support path. Moreover, means for reducing or canceling friction are provided that operate automatically when a workpiece support bumps against another one, for example, in case of accumulation.

The known systems do not describe a workpiece support system with forward travel stretch and return stretch in two planes that, by means of only one drive, provides safe deflection of the workpiece supports together with the traction means at the deflection points as well as a defined friction in normal operation between traction means and workpiece support while, at the same time, providing safe operation in accumulation operation. It is the object of the invention to design such a workpiece support system.

SUMMARY OF THE INVENTION

The invention solves this object in that the traction carriage comprises a clamping device with at least one upper and at least one lower clamping elements between which the traction means is arranged and by means of which the traction carriage can be clamped onto the traction means. Advantageous further embodiments are disclosed in the dependent claims.

The principal idea of the invention is that friction between the workpiece support and the traction means is to be provided by a clamping action. For this purpose, the traction carriage has a clamping device with at least one upper and one lower clamping element between which the traction means is arranged. By means of these clamping elements of the traction carriage the traction carriage can be clamped to the traction means. The clamping device moves completely with the traction carriage so that in normal operation no wear is observed. The clamping device is dimensioned such that the clamping force is sufficiently large so that the traction means can entrain the traction carriage. The traction carriage can have at least one spring element that exerts a spring force onto at least one clamping element and in this way effects the clamping action. For safety reasons, the clamping force must not be so great that, in operation without protective housing, operating personnel who are pinched by the workpiece support or the workpieces positioned thereon can be injured. In an advantageous embodiment the traction carriage therefore has an adjusting device for adjusting the pretension of the spring element.

The clamping element can comprise in a preferred embodiment a rotatable eccentric element which has, in particular, a rounded clamping surface with a spacing relative to the point of rotation which spacing is not constant, wherein the clamping surface is in contact with the traction means in the clamped state. The use of an eccentric element enables a jolt-free opening and closing of the clamping action of the traction carriage on the traction means. In particular by use of a rounded clamping surface, a steadily increasing clamping force can be achieved when effecting the clamping action. Moreover, the spring element can particularly engage the eccentric element such that the spring force effects rotation of the eccentric element in such direction that the clamping force is increased. As a counter clamping element, a bolt arranged underneath the traction means or an edge can be used.

When the workpiece support bumps against a leading workpiece support, the trailing workpiece support bumping into the leading one should be decoupled from the traction means so that the advancing force of the accumulated workpiece supports is not additive. For this reason, the workpiece support in the lead area in the travel direction can have an actuating element that, in case of bumping of the workpiece support into a leading workpiece support, will reduce the clamping force. The actuating element can have an actuating head that, when the workpiece support bumps into the leading workpiece support, will bump into a contact surface of the leading workpiece support. The actuating element can moreover comprise a pushing device having at one end the actuating head and adjoining with the other end the eccentric element. In this way, the clamping action can be released when accumulation occurs. The pushing device can moreover comprise a push rod that adjoins the eccentric element and further a pivot element having arranged at one end the actuating head and whose other end is connected to the push rod so as to be pivotable in a vertical plane. This has the advantage that the risk of being pinched at the deflection points is reduced.

At the stations of the workpiece support system the workpiece supports must be stopped. For this reason, on the base frame at least one stopping device can be arranged that comprises a stop element. The traction carriage can have a release element that, when the release element contacts the stop element, interacts with the stop element in such a way that the clamping force is reduced and the workpiece support is stopped. The stop element can be arranged to be movable or pivotable in such a way that it can be moved from a position in which the stop element engages a release element of a traction carriage into a position in which the stop element is not in engagement with the release element so that the workpiece support can be moved to the next station. In an advantageous embodiment, the release element is rigidly connected to the pushing device. In this way, the pushing device, when bumping into a leading workpiece support as well as when stopping at a station, provides a reduction of the clamping force.

The traction means can be deflected by at least two pulleys of which at least one can be driven. In addition to a clamping element arranged under the traction means, the traction carriage can be provided with at least one further deflection element, in particular a bolt, that moves underneath the traction means and is arranged between the traction means and the pulley when the traction carriage is in the area of the pulley. In this way it is possible to keep the advancing force small on horizontal stretches while it is still possible to provide the force for the lifting movement of the workpiece support. An improved action is achieved when the pulleys have at least one, particularly two, entraining elements or pressing elements moving along the circumference of the pulleys, for example, round rubber cords.

In order to prevent that the entire weight of the workpiece and of the workpiece support loads the traction means, the workpiece support, in particular the load carrier, can have rolls that roll on a rolling surface of the base frame of the workpiece support system and by means of which the weight of the workpiece resting thereon is introduced into the base frame. The rolling surface can be a component of a guide rail that at the same time provides a guiding action for the workpiece support.

BRIEF DESCRIPTION OF THE DRAWINGS

Possible embodiments of the invention are described with the aid of the attached figures.

It is shown in:

FIG. 11 a workpiece support according to FIG. 9 in closed clamping position in a side view;

FIG. 12 the workpiece support according to FIG. 11 in open clamping position in a side view;

Figure 1:
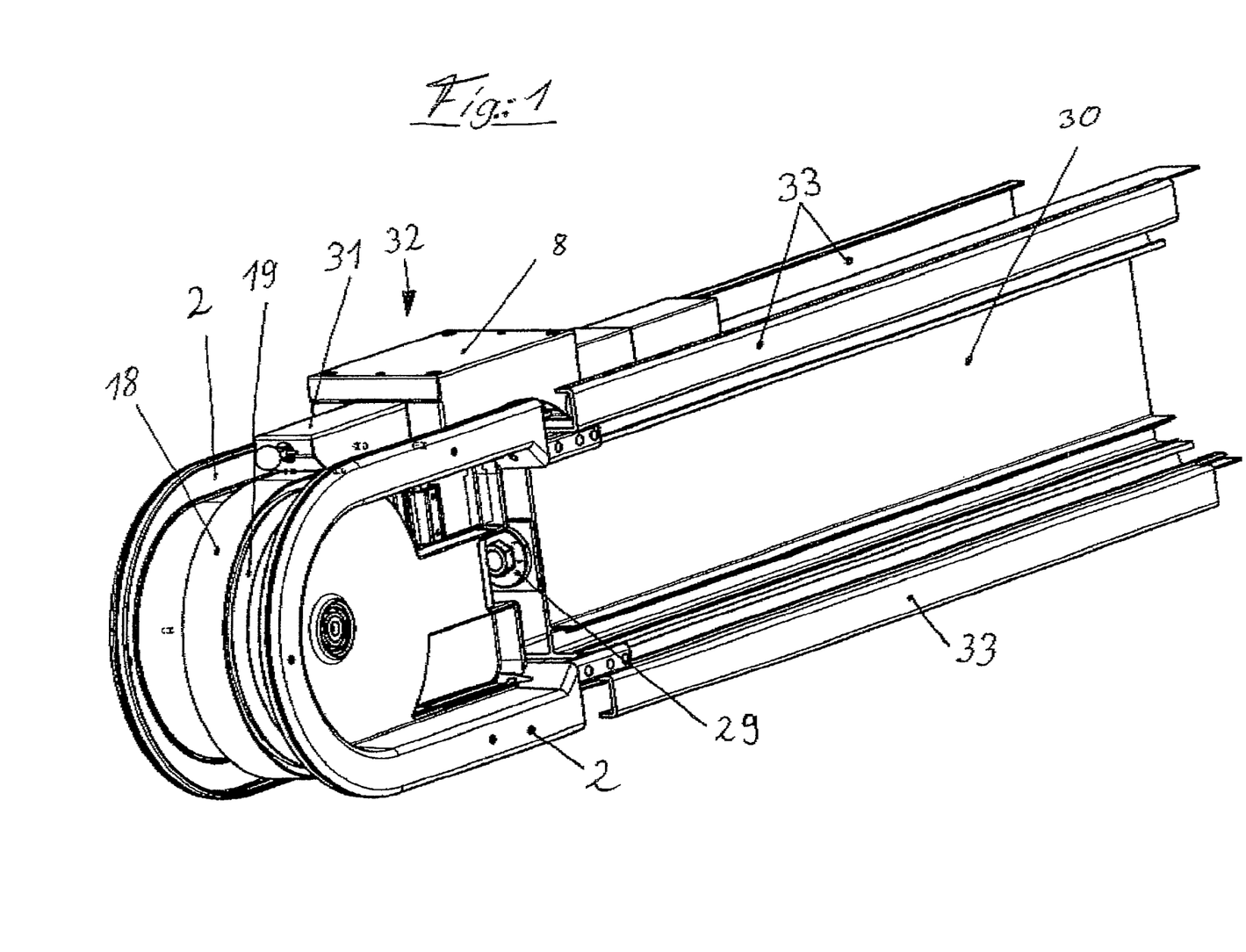
FIG. 1 a part of a workpiece support system in an isometric illustration.
Figure 2:
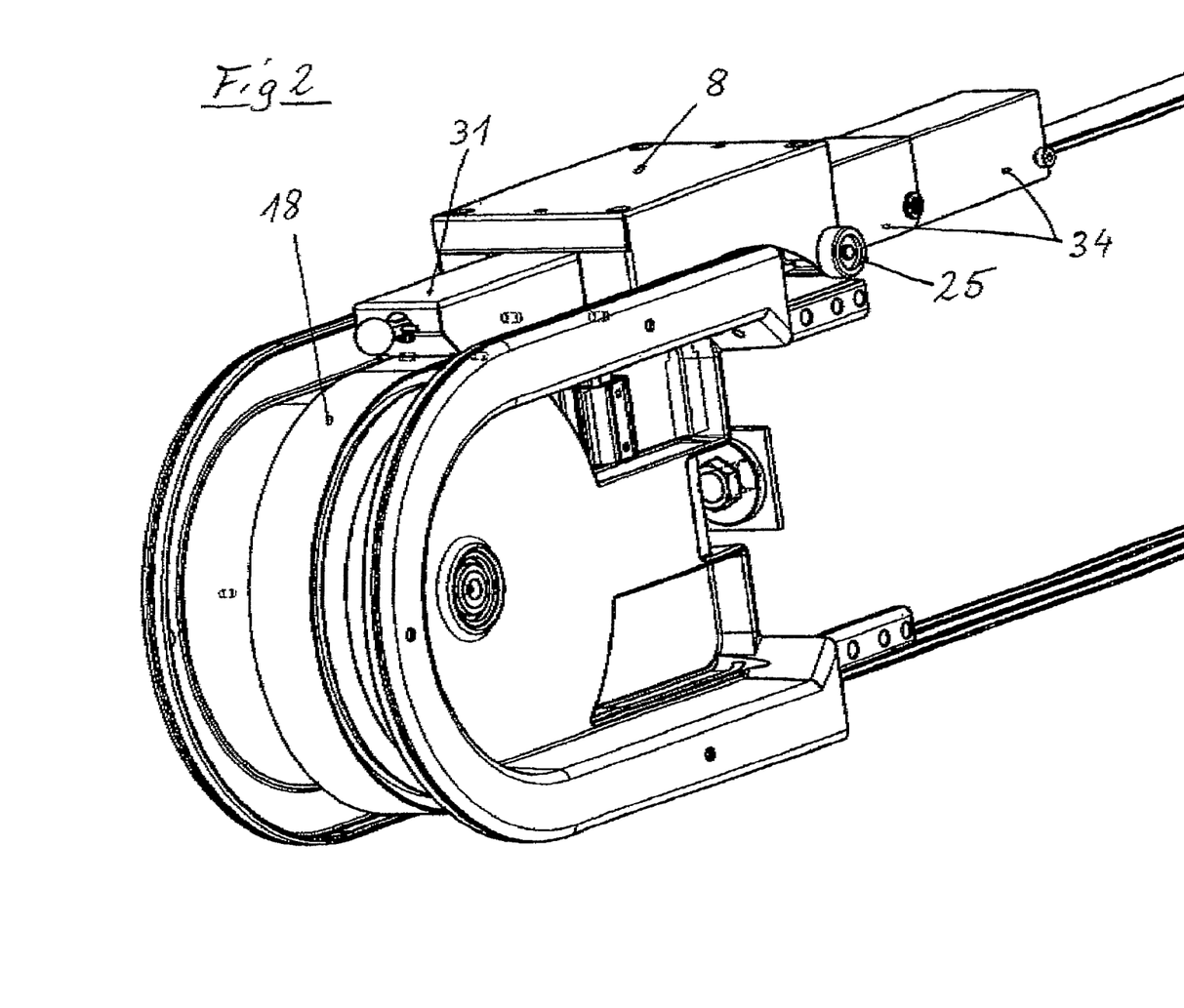
FIG. 2 the workpiece support system according to FIG. 1 with some elements removed.

FIGS. 1 through 8 show a part of a first embodiment of a workpiece support system that is able to move several workpiece supports. The workpiece support system has a circulating belt 18 that in the illustrated part is deflected by means of the pulley 19. The second pulley, not illustrated, is arranged at the other end of the workpiece support system. The driven belt 18 moves a workpiece support 32 that comprises a traction carriage 31 as well as load carrier 8. The load carrier has four rolls 25 that move in guide rails 33 connected to the base frame 30 and arranged on either side of the belt 18 as well as the deflection flanges 2. In FIG. 2 a roll 25 is visible as a result of the guide rail 33 being removed in the drawing. By means of the guide rails 33 the weight force of a workpiece (not illustrated) on the workpiece support 32 is transferred onto the base frame 30.

Figure 3:
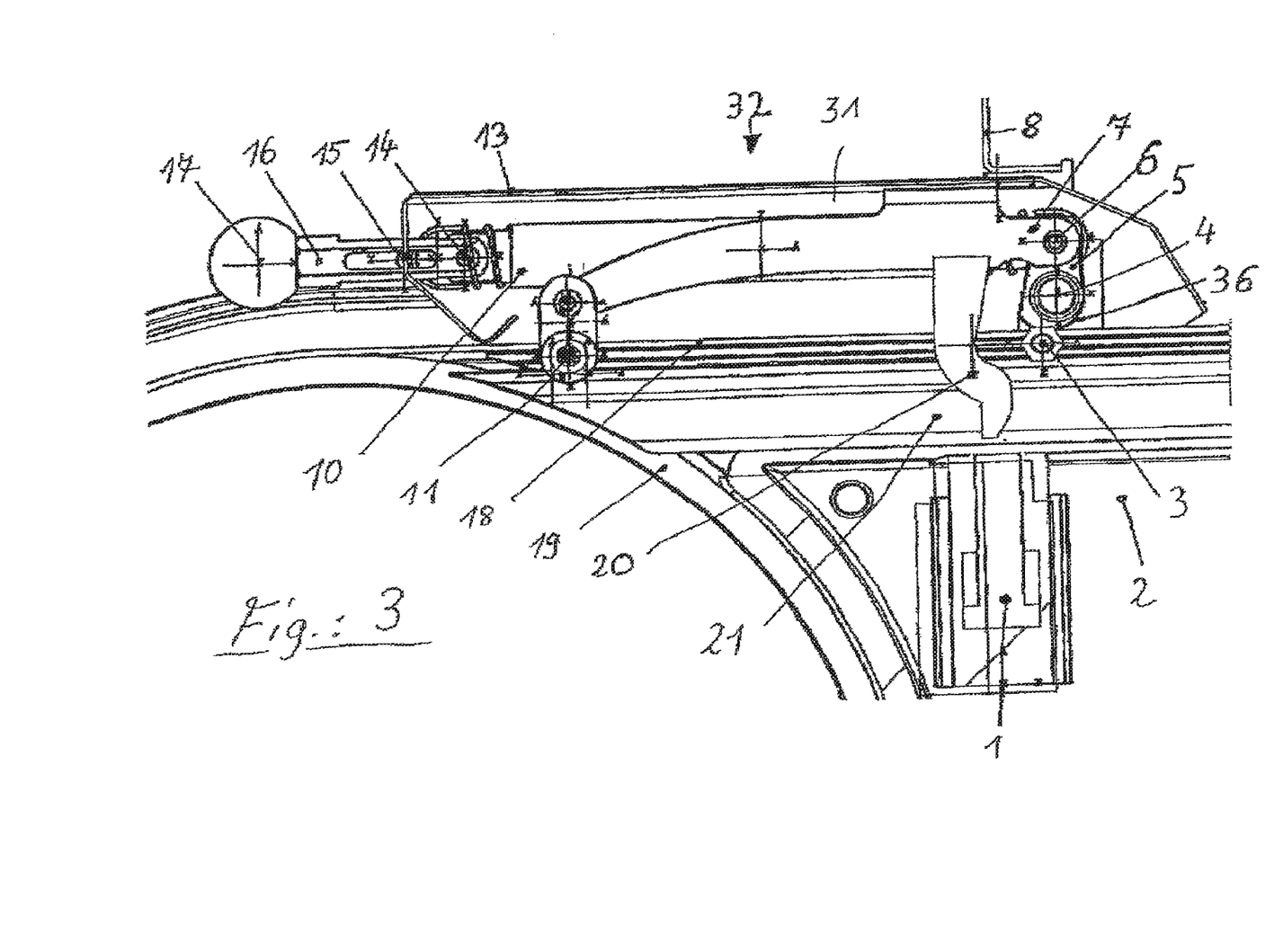
FIG. 3 a detail of the workpiece support of FIG. 1 in closed clamping position in a section view.
Figure 5:
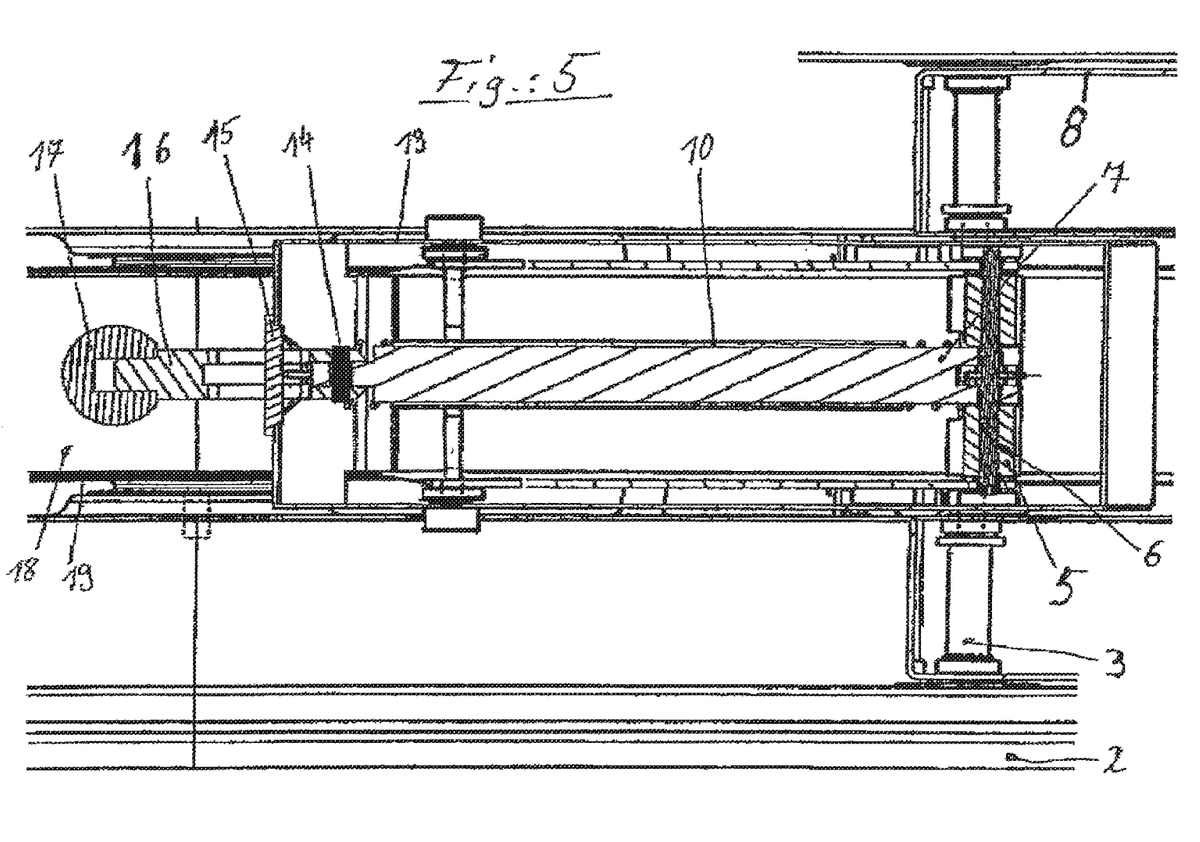
FIG. 5 the workpiece support according to FIG. 3 in plan view with some elements removed.

FIG. 3 shows a detail of the workpiece support 32 with the load carrier 8 and the traction carriage 31 in closed clamping position in a section view. The traction carriage 31 has a hood 13. The traction carriage 31 has moreover a clamping device comprised of two clamping elements 3 and 5. The upper clamping element 5 is an eccentric element that is rotatably supported by means of main eccentric bolt 4. The lower clamping element 3 is a counter bolt. Between the clamping surface 36 of the eccentric element 5 and the counter bolt 3 there is a belt 18. The load carrier 8 is connected by counter bolt 3 to the traction carriage. FIG. 5 shows the workpiece support 32 in this position in plan view with removed hood.

To the eccentric element 5 a push rod 7 is connected. By means of the push rod 7 of a pushing device the spring force of a spring element 10 acts on the eccentric element 5 and effects a clamping force. The spring element 10 passes through the hood 13 and is anchored thereat by means of a spring bolt 15. At the leading end of the push rod 7 a pivot element 16 is arranged that is pivotably connected by means of an articulation bolt 14 to the push rod 7. At the other end of the pivot element 16 an actuating head 17 is arranged. When the workpiece support 32 bumps into the leading workpiece support, the push rod 7 is moved by means of the actuating head 17 and the pivot element 16 against the force of the spring element 10. The push rod 7 effects rotation of the eccentric element 5 so that the clamping force is reduced. An equilibrium between the clamping force and the advancing force results. The push rod 7 interacts by means of the actuating bolt 6 with the eccentric element 5. In an embodiment that is not illustrated, the traction carriage has an adjusting device for adjusting the pretension of the spring element.

Figure 4:
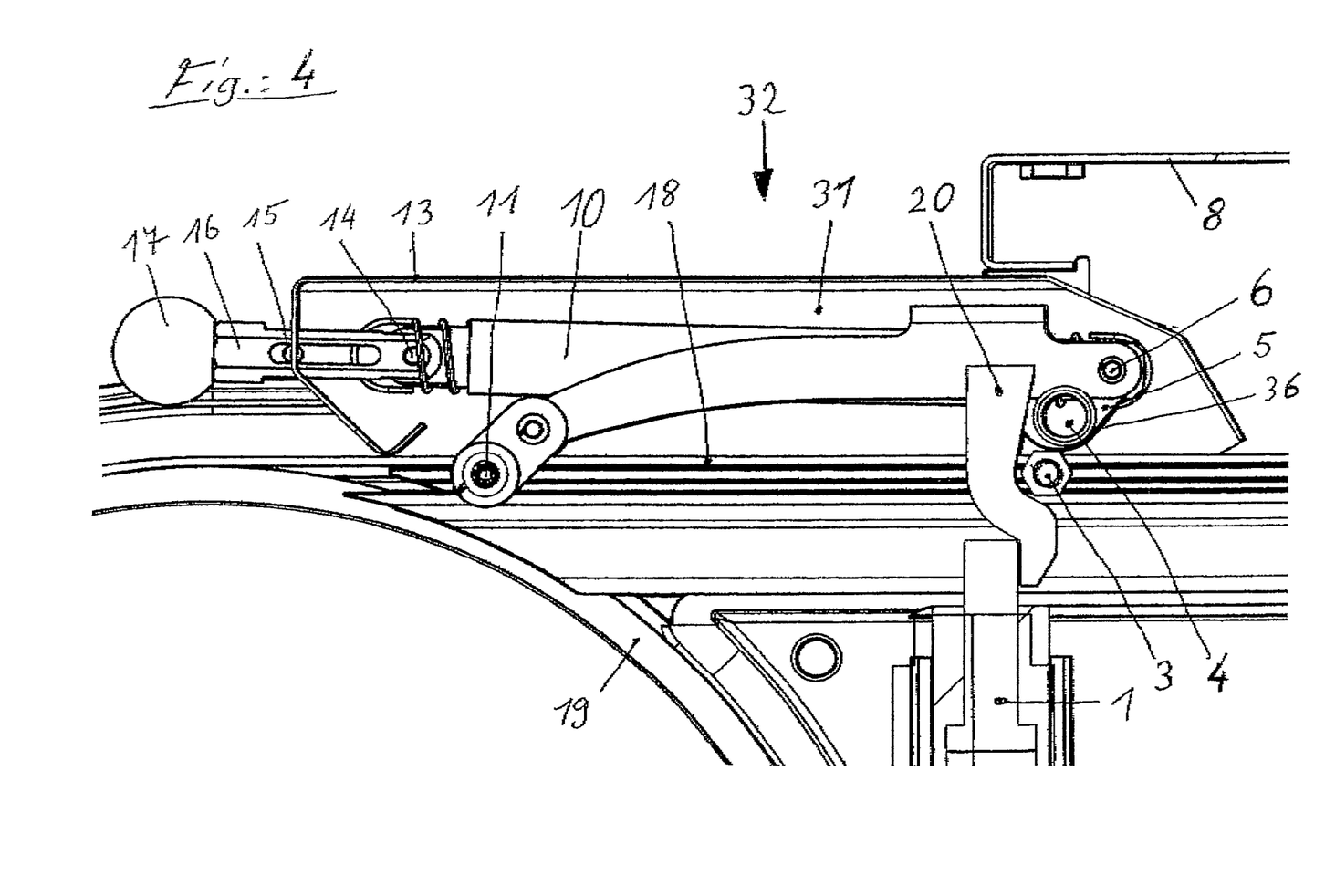
FIG. 4 the workpiece support according to FIG. 3 in open clamping position in a section view.
Figure 6:
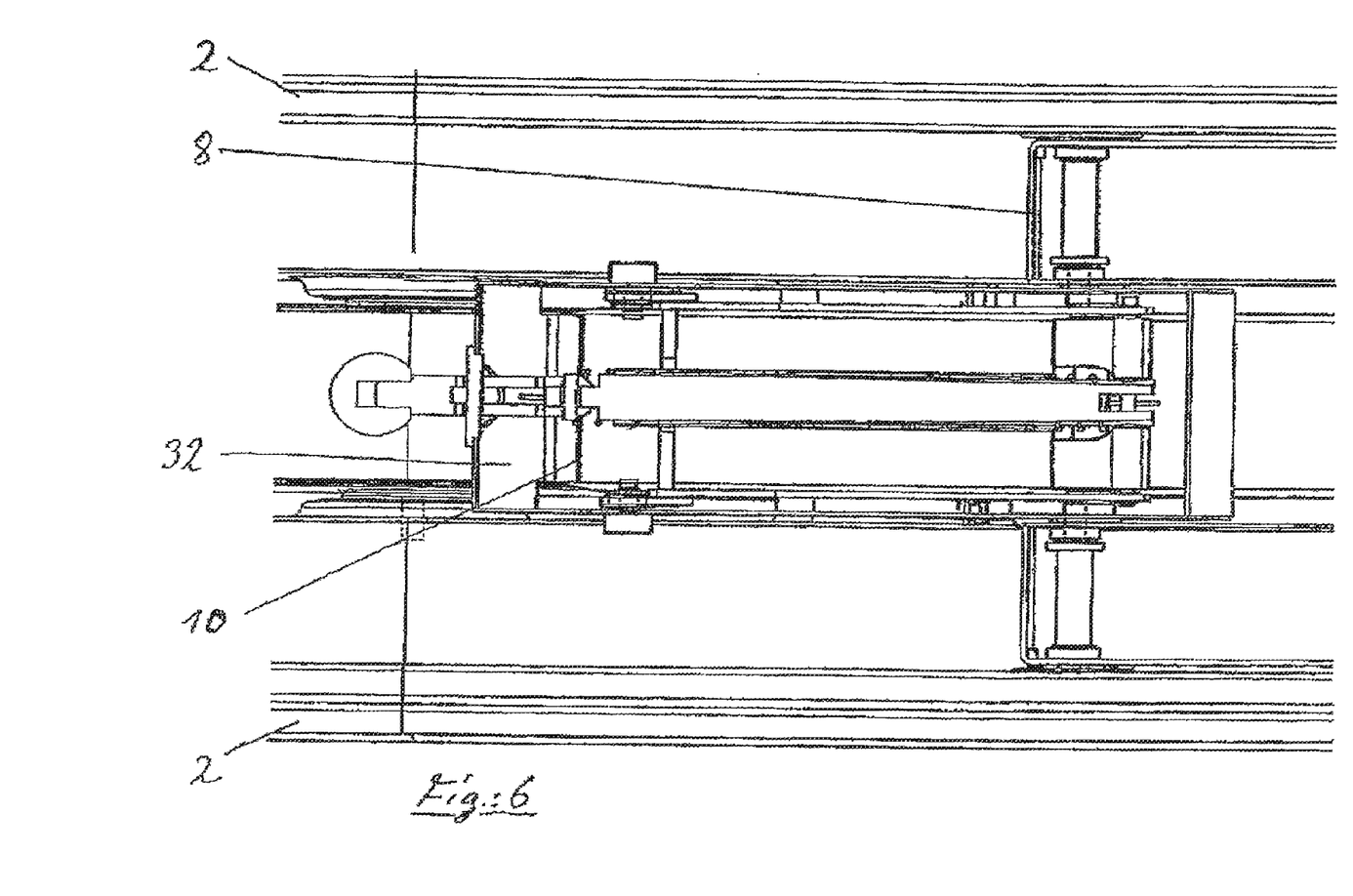
FIG. 6 the workpiece support according to FIG. 4 in plan view.
Figure 7:
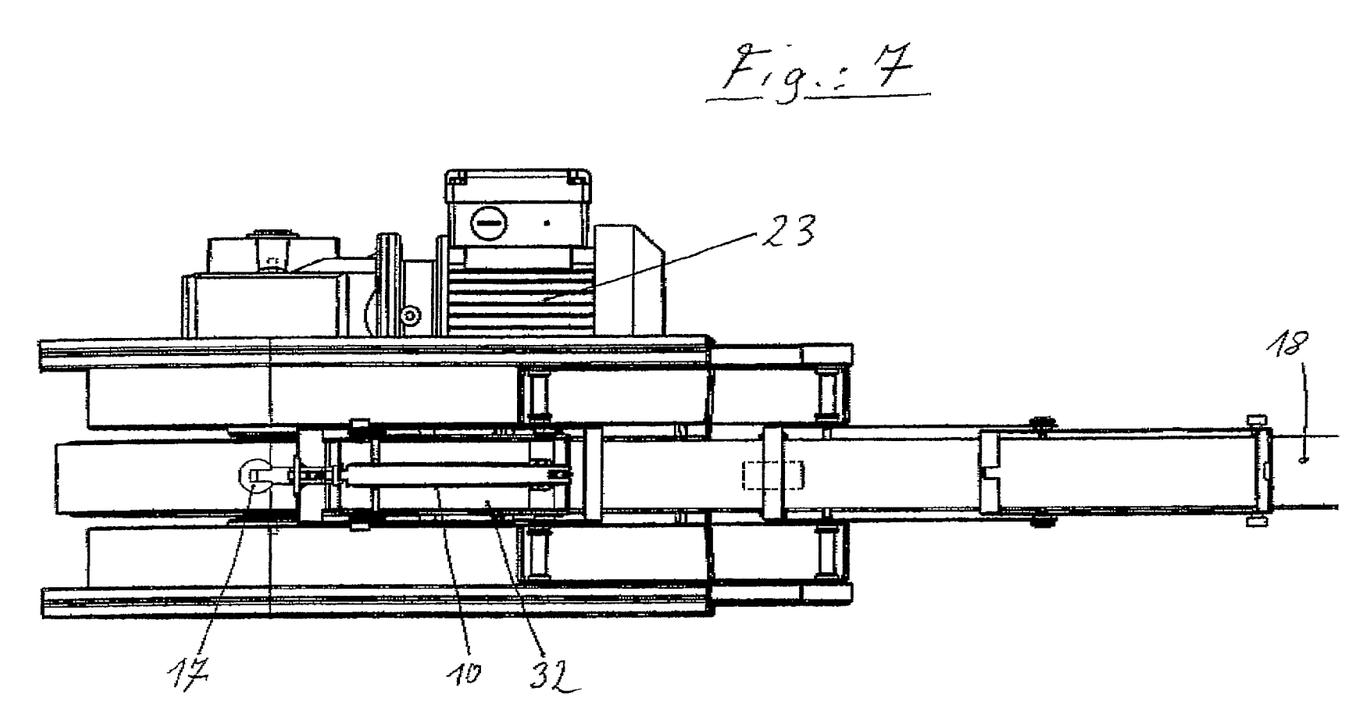
FIG. 7 the workpiece support according to FIG. 5 in a larger detail view.

FIG. 4 shows the workpiece support 32 of FIG. 3 in this open clamping position in a section view. Release of the clamping action however is not effected by bumping onto a leading workpiece support but by the stop element 1 that is connected to the base frame 30. The traction carriage 31 has a release element 20 that cooperates with the stop element 1. The release element 20 is rigidly connected to the pushing device. When the release element 20 bumps against the stop element 1 the clamping force is reduced, i.e., the same already disclosed effect is observed as when the workpiece support 32 bumps against a leading workpiece support. The stopping device comprises means, not illustrated, in order to pivot the stop element 1 such that it no longer interacts with the release element 20 so that the workpiece support 32 is released. The FIGS. 6 and 7 show the workpiece support 32 in this position in a plan view with removed hood.

Figure 8:
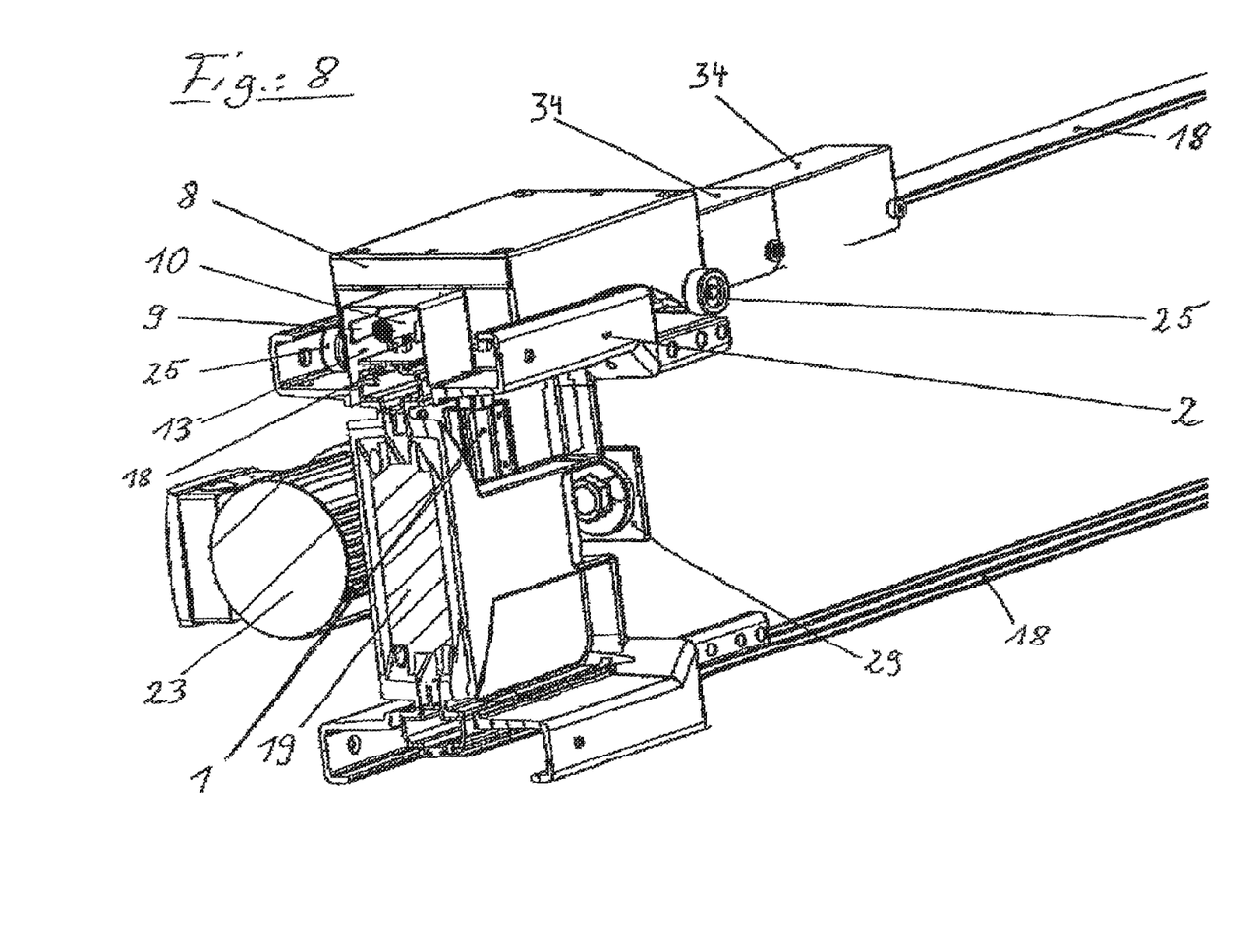
FIG. 8 the workpiece support system of FIG. 1 in an isometric section illustration.
Figure 9:
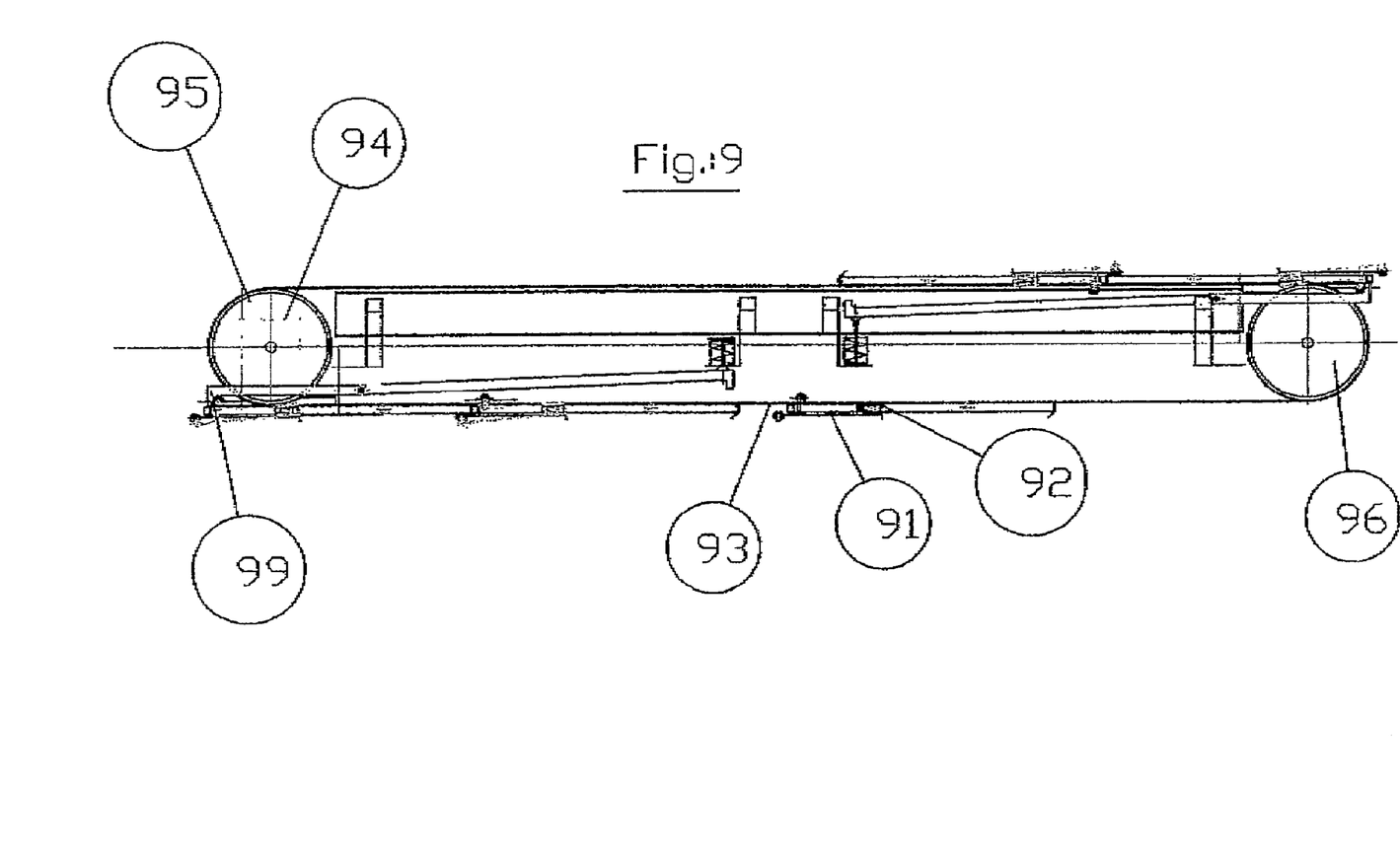
FIG. 9 a second embodiment of a workpiece support system in a side view.
Figure 10:
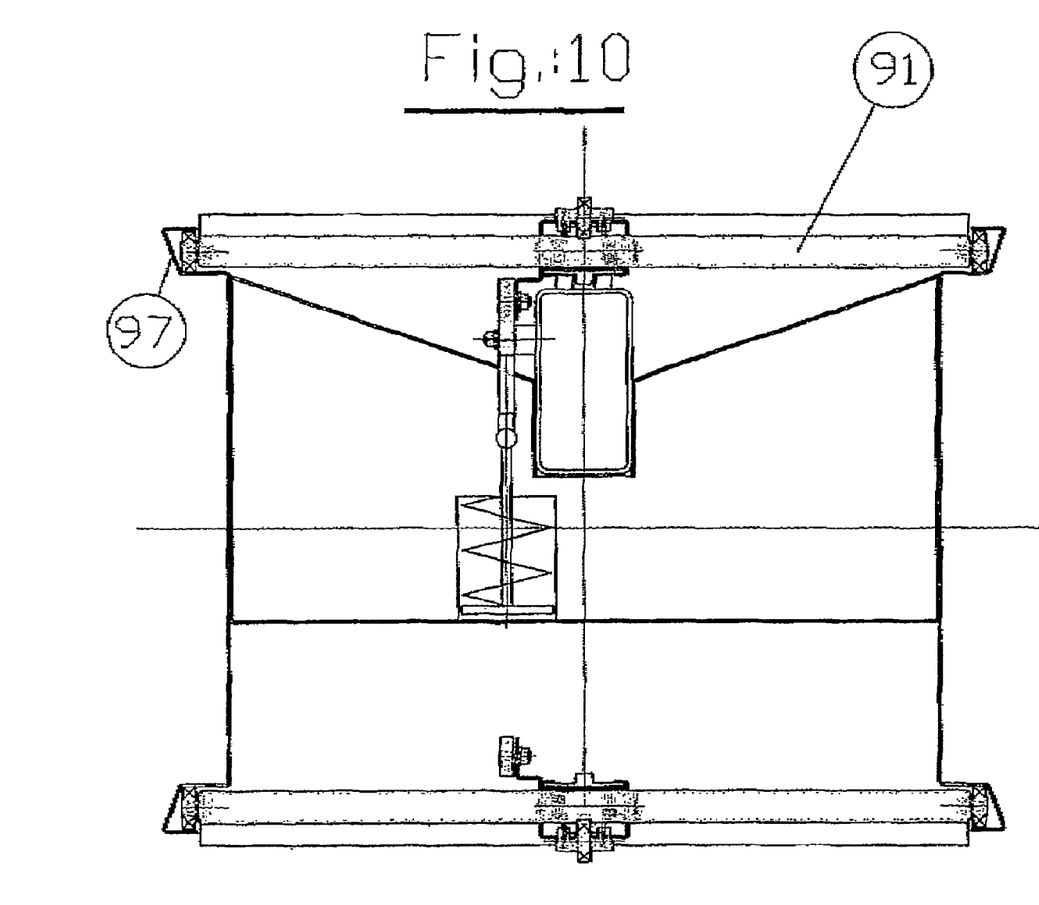
FIG. 10 the workpiece support system according to FIG. 9 in a section illustration.
Figure 13:
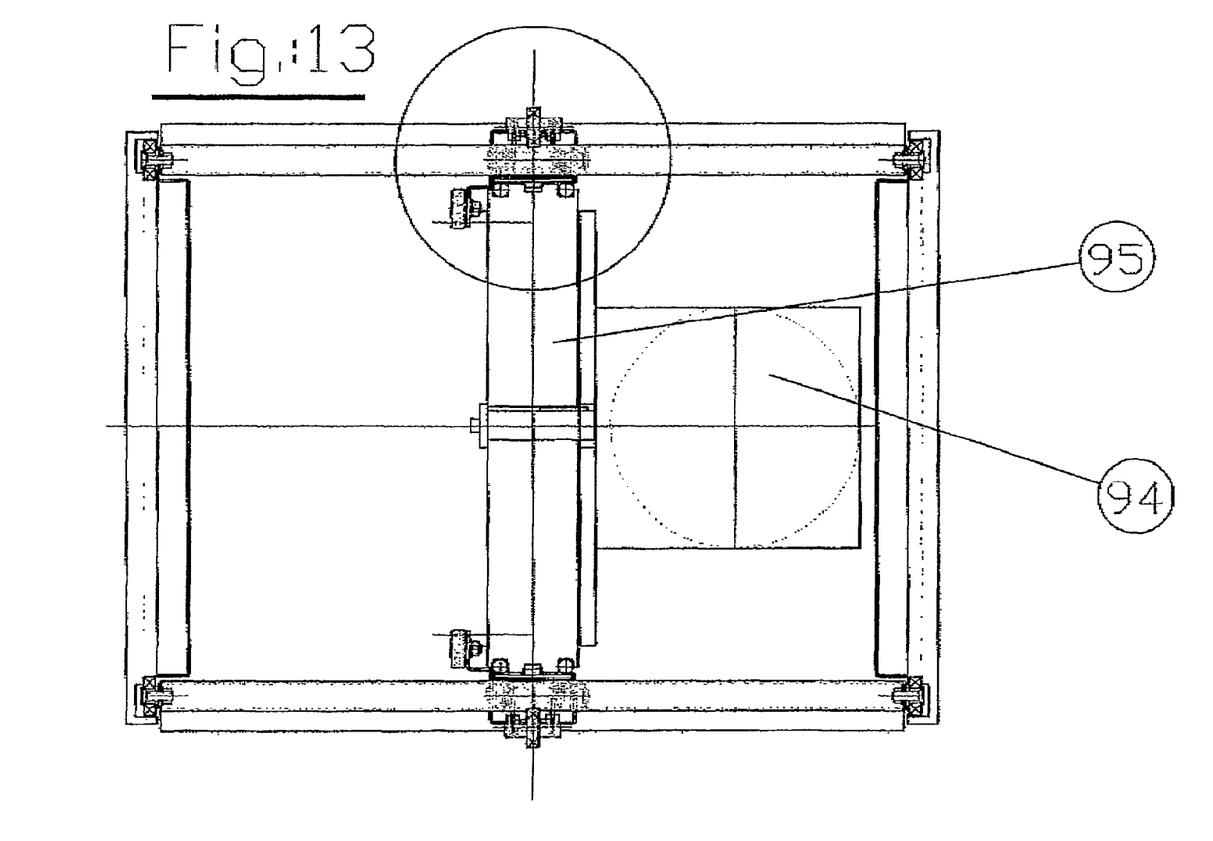
FIG. 13 the drive head of the workpiece support system according to FIG. 9.
Figure 14:
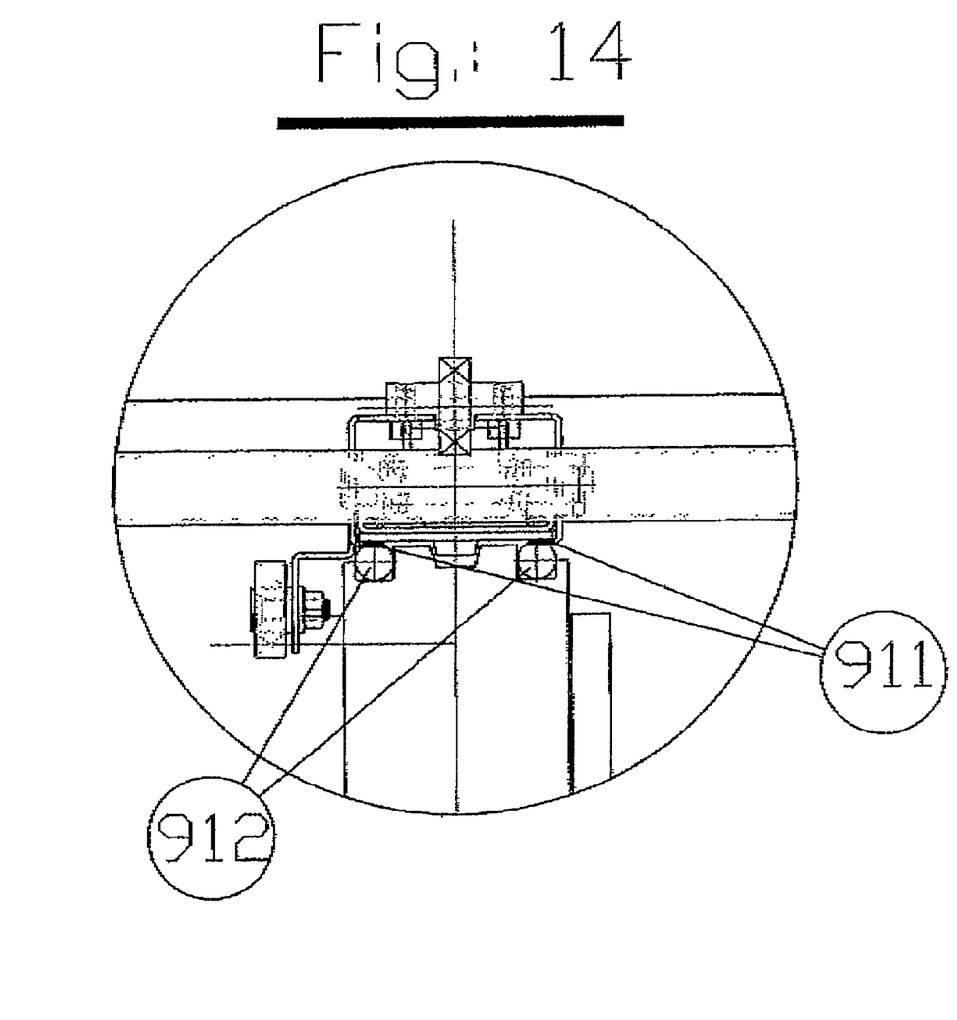
FIG. 14 an enlarged detail view of the workpiece support system according to FIG. 13.

FIG. 8 shows the workpiece support system of FIG. 1 in isometric section illustration. Illustrated is the pulley 19 driven by the gear motor 23. The tension of the belt 18 moving in a belt guide 21 is adjustable by the tensioning element 29. The pulley has about its circumference two recesses in which two round rubber cords are moving. The bolts 3 and 11 of the traction carrier 31 are clamped as deflection elements in the area of the pulley between the belt 18 and the rubber cords so that a safe deflection of the workpiece support 32 together with the belt 18 is enabled. The workpiece support 32 has, as illustrated in FIG. 2, two trailing elements 34 so that, when a workpiece support bumps against a leading one, its actuating head 17 bumps against a contact surface of the last trailing element.

FIGS. 9 through 14 show a second embodiment of a workpiece support system. When considering that the workpiece supports 91 are simply driven by means of clamping action 92 on a traction support 93, the entire drive can be realized by one traction carrier. The closed traction means, for example, a flat belt 93, is driven by a motor 94 and a drive roll 95 and returned by means of pulley 96. The workpiece supports are kept on track by means of guide paths 97. By means of a preferably mechanical clamping action, for example, by a spring 98, the driven is clamped and therefore the workpiece support is entrained. By means of the clamping force the advancing force can be adjusted. When the workpiece support bumps into a stop 99 or the ramp 910 of the leading workpiece support, the clamping action is automatically released and the advancing force is minimized. When the stop or the leading workpiece support move away, by means of the reactivated clamping action the advancing force is transmitted. At the end of the conveying stretch the traction means is deflected. The pulley is designed such that it not only deflects the traction carrier but also drives by means of positive locking action or friction additionally the workpiece support. In this example, the lower edge 911 of the clamping means itself is clamped between the round rubber cord 912 mounted on the pulley and the traction means 93 and in this way the advancing force is significantly increased. In this way, it is possible to keep the advancing force small on the horizontal stretches and to still be able to provide the force for the lifting movement of the workpiece support. After deflection, the workpiece support is returned in upside down position and deflected again. The decisive advantage is that for this entire system only one drive is required, the workpiece supports can be accumulated and decoupled, and the drive force for each workpiece support can be kept at a minimum. Moreover, the control expenditure is significantly reduced because the lift-action return devices are no longer required. This makes the system less expensive.

What is claimed is:

1. A workpiece support system comprising:
a driven, circulating traction means;
a stationary base frame;
at least one workpiece support that comprises a load carrier and a traction carriage;
wherein the traction carriage comprises a clamping device with at least one upper and at least one lower clamping elements between which the traction means is arranged and by means of which the traction carriage is clamped by a clamping action onto the traction means;
wherein the traction carriage has at least one spring element that exerts a spring force on at least one of the upper and lower clamping elements for effecting the clamping action;
wherein the at least one workpiece support has an actuating element arranged in a leading area in a travel direction of the at least one workpiece support, wherein the actuating element reduces a clamping force of the clamping action when the at least one workpiece support bumps into a leading workpiece support in the travel direction;
wherein the traction means is guided about two pulleys;
wherein one of the upper and lower clamping elements comprises a rotatable eccentric element with a clamping surface that has a spacing to a point of rotation of the eccentric element which spacing is not constant, wherein the clamping surface is in contact in a clamped state with the traction means.

2. The workpiece support system according to claim 1, wherein the traction carriage has an adjusting device for adjusting a pretension of the at least one spring element.

3. The workpiece support system according to claim 1, wherein the clamping surface is rounded.

4. The workpiece support system according to claim 1, wherein the at least one spring element is connected in such a way to the eccentric element that a spring force of the at least one spring element effects rotation of the eccentric element so as to increase the clamping force.

5. The workpiece support system according to claim 1, wherein the actuating element comprises an actuating head that, when the at least one workpiece support bumps into a leading workpiece support in the travel direction, bumps against a contact surface of said leading workpiece support.

6. The workpiece support system according to claim 5, wherein the actuating element comprises a pushing device, wherein the pushing device has a first end and a second end, wherein the actuating head is arranged at the first end and the second end is connected to the eccentric element.

7. The workpiece support system according to claim 6, wherein the pushing device comprises a push rod and a pivot element, wherein the push rod is connected to the eccentric element and the pivot element has a first end connected to the actuating head and a second end connected to the push rod so as to be pivotable in a vertical plane.

8. The workpiece support system according to claim 7, wherein the release element is rigidly connected to the pushing device.

9. The workpiece support system according to claim 5, wherein on the base frame at least one stopping device is arranged that comprises a stop element, wherein the traction carriage has a release element that, when the release element bumps against the stop element, interacts with the stop element in such a way that the clamping force is reduced.

10. The workpiece support system according to claim 9, wherein the stop element is arranged to be movable or pivotable in such a way that from a position in which the stop element is in engagement with the release element of the traction carriage the stop element is transferred into a position in which the stop element is not in engagement with the release element.

11. The workpiece support system according to claim 1, wherein one of the two pulleys is driven.

12. The workpiece support system according to claim 1, wherein the two pulleys have at least one round rubber cord extending circumferentially about the two pulleys.

13. The workpiece support system according to claim 1, wherein the workpiece support has rolls that move on a rolling surface of the base frame, wherein a weight force of a supported workpiece is introduced into the base frame by the rolls.

14. The workpiece support system according to claim 13, wherein the rolls are provided on the load carrier.

15. A workpiece support system comprising:
a driven, circulating traction means;
a stationary base frame;
at least one workpiece support that comprises a load carrier and a traction carriage;
wherein the traction carriage comprises a clamping device with at least one upper and at least one lower clamping elements between which the traction means is arranged and by means of which the traction carriage is clamped by a clamping action onto the traction means;
wherein the traction carriage has at least one spring element that exerts a spring force on at least one of the upper and lower clamping elements for effecting the clamping action;
wherein the at least one workpiece support has an actuating element arranged in a leading area in a travel direction of the at least one workpiece support, wherein the actuating element reduces a clamping force of the clamping action when the at least one workpiece support bumps into a leading workpiece support in the travel direction;
wherein the traction means is guided about two pulleys;
wherein one of the upper and lower clamping elements comprises a bolt that is arranged underneath the traction means.

16. A workpiece support system comprising:
a driven, circulating traction means;
a stationary base frame;
at least one workpiece support that comprises a load carrier and a traction carriage;
wherein the traction carriage comprises a clamping device with at least one upper and at least one lower clamping elements between which the traction means is arranged and by means of which the traction carriage is clamped by a clamping action onto the traction means;
wherein the traction carriage has at least one spring element that exerts a spring force on at least one of the upper and lower clamping elements for effecting the clamping action;
wherein the at least one workpiece support has an actuating element arranged in a leading area in a travel direction of the at least one workpiece support, wherein the actuating element reduces a clamping force of the clamping action when the at least one workpiece support bumps into a leading workpiece support in the travel direction;
wherein the traction means is guided about two pulleys;
wherein the traction carriage has at least one deflection element moving underneath the traction means, wherein the at least one deflection element is arranged between the traction means and one of the two pulleys as the traction carriage passes said one of the two pulleys.

17. The workpiece support system according to claim 16, wherein the at least one deflection element is a bolt.

* * * * *